(12) United States Patent
Tamborski

(10) Patent No.: US 11,907,566 B1
(45) Date of Patent: Feb. 20, 2024

(54) COORDINATION OF TASK EXECUTION IN A DISTRIBUTED STORAGE NETWORK

(71) Applicant: Pure Storage, Inc., Mountain View, CA (US)

(72) Inventor: Patrick A. Tamborski, Chicago, IL (US)

(73) Assignee: PURE STORAGE, INC., Santa Clara, CA (US)

( * ) Notice: Subject to any disclaimer, the term of this patent is extended or adjusted under 35 U.S.C. 154(b) by 0 days.

(21) Appl. No.: 17/007,863

(22) Filed: Aug. 31, 2020

Related U.S. Application Data

(63) Continuation of application No. 15/248,716, filed on Aug. 26, 2016, now abandoned.

(Continued)

(51) Int. Cl.
*G06F 3/06* (2006.01)
*H04L 9/40* (2022.01)
*G06F 8/65* (2018.01)
*H04L 67/1097* (2022.01)
*H04L 67/00* (2022.01)

(Continued)

(52) U.S. Cl.
CPC ............ *G06F 3/0653* (2013.01); *G06F 3/064* (2013.01); *G06F 3/067* (2013.01); *G06F 3/0611* (2013.01); *G06F 3/0614* (2013.01); *G06F 3/0619* (2013.01); *G06F 3/0659* (2013.01); *G06F 3/0661* (2013.01); *G06F 8/65* (2013.01); *G06F 11/1092* (2013.01); *H03M 13/154* (2013.01); *H03M 13/3761* (2013.01); *H04L 63/061* (2013.01); *H04L 67/1097* (2013.01); *H04L 67/34* (2013.01);

*H04L 67/60* (2022.05); *H03M 13/1515* (2013.01); *H04L 67/01* (2022.05); *H04L 67/02* (2013.01); *H04L 67/06* (2013.01)

(58) Field of Classification Search
None
See application file for complete search history.

(56) References Cited

U.S. PATENT DOCUMENTS 4,092,732 A  5/1978 Ouchi
5,454,101 A  9/1995 Mackay
(Continued)

OTHER PUBLICATIONS

Chung; An Automatic Data Segmentation Method for 3D Measured Data Points; National Taiwan University, pp. 1-8; 1998.

(Continued)

*Primary Examiner* — Michael Alsip
(74) *Attorney, Agent, or Firm* — GARLICK & MARKISON; Harry S. Tyson, Jr.

(57) ABSTRACT

Methods for use in a dispersed storage network (DSN) to coordinate execution of tasks by storage units of the DSN. In an embodiment, a computing device of the DSN receives a task (e.g., a maintenance task) to be performed by at least one storage unit of a plurality of storage units. The computing device determines the availability of processing resources of the storage units for execution of the received task. The computing device further compares the respective availability of the processing resources of the storage units of the plurality of storage units to identify a storage unit for execution of the received task, and allocates the received task to the identified storage. In various embodiments, comparing the respective availability of the processing resources includes predicting an impact, with respect to other storage units of the DSN, of performing the received task on the identified storage unit.

20 Claims, 9 Drawing Sheets

Related U.S. Application Data

(60) Provisional application No. 62/222,819, filed on Sep. 24, 2015.

(51) Int. Cl.

| | | |
|---|---|---|
| *G06F 11/10* | (2006.01) | |
| *H03M 13/15* | (2006.01) | |
| *H03M 13/37* | (2006.01) | |
| *H04L 67/60* | (2022.01) | |
| *H04L 67/02* | (2022.01) | |
| *H04L 67/06* | (2022.01) | |
| *H04L 67/01* | (2022.01) | |

(56) References Cited

U.S. PATENT DOCUMENTS

| | | |
|---|---|---|
| 5,485,474 A | 1/1996 | Rabin |
| 5,774,643 A | 6/1998 | Lubbers |
| 5,802,364 A | 9/1998 | Senator |
| 5,809,285 A | 9/1998 | Hilland |
| 5,890,156 A | 3/1999 | Rekieta |
| 5,987,622 A | 11/1999 | Lo Verso |
| 5,991,414 A | 11/1999 | Garay |
| 6,012,159 A | 1/2000 | Fischer |
| 6,058,454 A | 5/2000 | Gerlach |
| 6,128,277 A | 10/2000 | Bruck |
| 6,175,571 B1 | 1/2001 | Haddock |
| 6,192,472 B1 | 2/2001 | Garay |
| 6,256,688 B1 | 7/2001 | Suetaka |
| 6,272,658 B1 | 8/2001 | Steele |
| 6,301,604 B1 | 10/2001 | Nojima |
| 6,356,949 B1 | 3/2002 | Katsandres |
| 6,366,995 B1 | 4/2002 | Vilkov |
| 6,374,336 B1 | 4/2002 | Peters |
| 6,415,373 B1 | 7/2002 | Peters |
| 6,418,539 B1 | 7/2002 | Walker |
| 6,449,688 B1 | 9/2002 | Peters |
| 6,567,948 B2 | 5/2003 | Steele |
| 6,571,282 B1 | 5/2003 | Bowman-Amuah |
| 6,609,223 B1 | 8/2003 | Wolfgang |
| 6,718,361 B1 | 4/2004 | Basani |
| 6,760,808 B2 | 7/2004 | Peters |
| 6,785,768 B2 | 8/2004 | Peters |
| 6,785,783 B2 | 8/2004 | Buckland |
| 6,826,711 B2 | 11/2004 | Moulton |
| 6,879,596 B1 | 4/2005 | Dooply |
| 7,003,688 B1 | 2/2006 | Pittelkow |
| 7,024,451 B2 | 4/2006 | Jorgenson |
| 7,024,609 B2 | 4/2006 | Wolfgang |
| 7,080,101 B1 | 7/2006 | Watson |
| 7,103,824 B2 | 9/2006 | Halford |
| 7,103,915 B2 | 9/2006 | Redlich |
| 7,111,115 B2 | 9/2006 | Peters |
| 7,140,044 B2 | 11/2006 | Redlich |
| 7,146,644 B2 | 12/2006 | Redlich |
| 7,171,493 B2 | 1/2007 | Shu |
| 7,222,133 B1 | 5/2007 | Raipurkar |
| 7,240,236 B2 | 7/2007 | Cutts |
| 7,272,613 B2 | 9/2007 | Sim |
| 7,636,724 B2 | 12/2009 | De La Torre |
| 7,817,562 B1 | 10/2010 | Kemeny |
| 8,244,962 B2 | 8/2012 | Swing |
| 9,172,747 B2 | 10/2015 | Walters |
| 10,140,177 B2 | 11/2018 | Grube |
| 2002/0062422 A1 | 5/2002 | Butterworth |
| 2002/0166079 A1 | 11/2002 | Ulrich |
| 2003/0018927 A1 | 1/2003 | Gadir |
| 2003/0037261 A1 | 2/2003 | Meffert |
| 2003/0065617 A1 | 4/2003 | Watkins |
| 2003/0084020 A1 | 5/2003 | Shu |
| 2004/0024963 A1 | 2/2004 | Talagala |
| 2004/0122917 A1 | 6/2004 | Menon |
| 2004/0215998 A1 | 10/2004 | Buxton |
| 2004/0228493 A1 | 11/2004 | Ma |
| 2005/0100022 A1 | 5/2005 | Ramprashad |
| 2005/0114594 A1 | 5/2005 | Corbett |
| 2005/0125593 A1 | 6/2005 | Karpoff |
| 2005/0131993 A1 | 6/2005 | Fatula, Jr. |
| 2005/0132070 A1 | 6/2005 | Redlich |
| 2005/0144382 A1 | 6/2005 | Schmisseur |
| 2005/0229069 A1 | 10/2005 | Hassner |
| 2006/0047907 A1 | 3/2006 | Shiga |
| 2006/0136448 A1 | 6/2006 | Cialini |
| 2006/0156059 A1 | 7/2006 | Kitamura |
| 2006/0224603 A1 | 10/2006 | Correll, Jr. |
| 2006/0294301 A1 | 12/2006 | Zohar |
| 2007/0079081 A1 | 4/2007 | Gladwin |
| 2007/0079082 A1 | 4/2007 | Gladwin |
| 2007/0079083 A1 | 4/2007 | Gladwin |
| 2007/0088970 A1 | 4/2007 | Buxton |
| 2007/0174192 A1 | 7/2007 | Gladwin |
| 2007/0214285 A1 | 9/2007 | Au |
| 2007/0234110 A1 | 10/2007 | Soran |
| 2007/0283167 A1 | 12/2007 | Venters |
| 2008/0168234 A1 | 7/2008 | Gill |
| 2009/0094251 A1 | 4/2009 | Gladwin |
| 2009/0094318 A1 | 4/2009 | Gladwin |
| 2010/0023524 A1 | 1/2010 | Gladwin |
| 2010/0262979 A1 | 10/2010 | Borchers |
| 2016/0266934 A1 | 9/2016 | Rimoni |
| 2017/0123848 A1 | 5/2017 | Borich |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

(56) References Cited

OTHER PUBLICATIONS

Zeilenga; Lightweight Directory Access Protocol (LDAP): String Representation of Distinguished Names; IETF Network Working Group; RFC 4514; Jun. 2006; pp. 1-15.
Zeilenga; Lightweight Directory Access Protocol (LDAP): Technical Specification Road Map; IETF Network Working Group; RFC 4510; Jun. 2006; pp. 1-8.

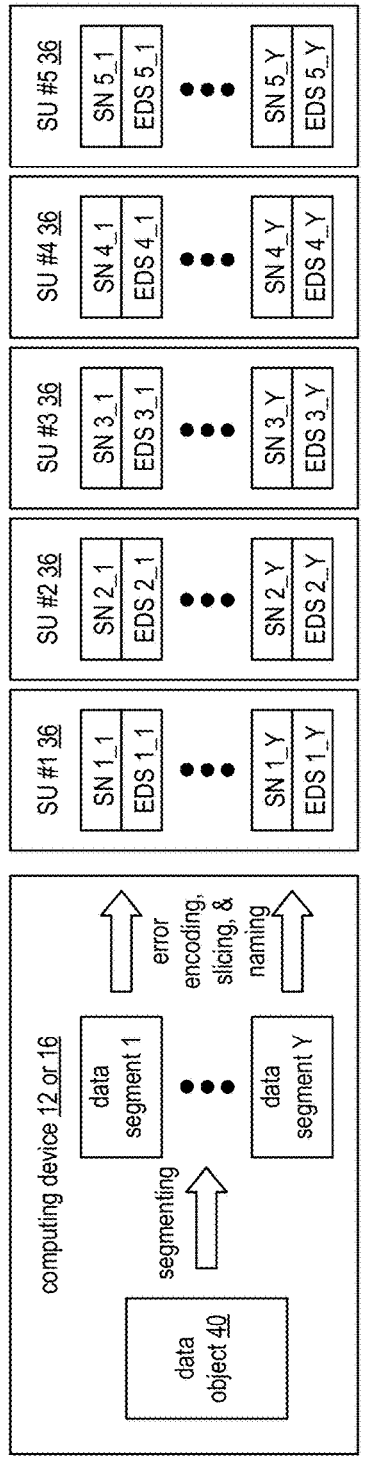
FIG. 3
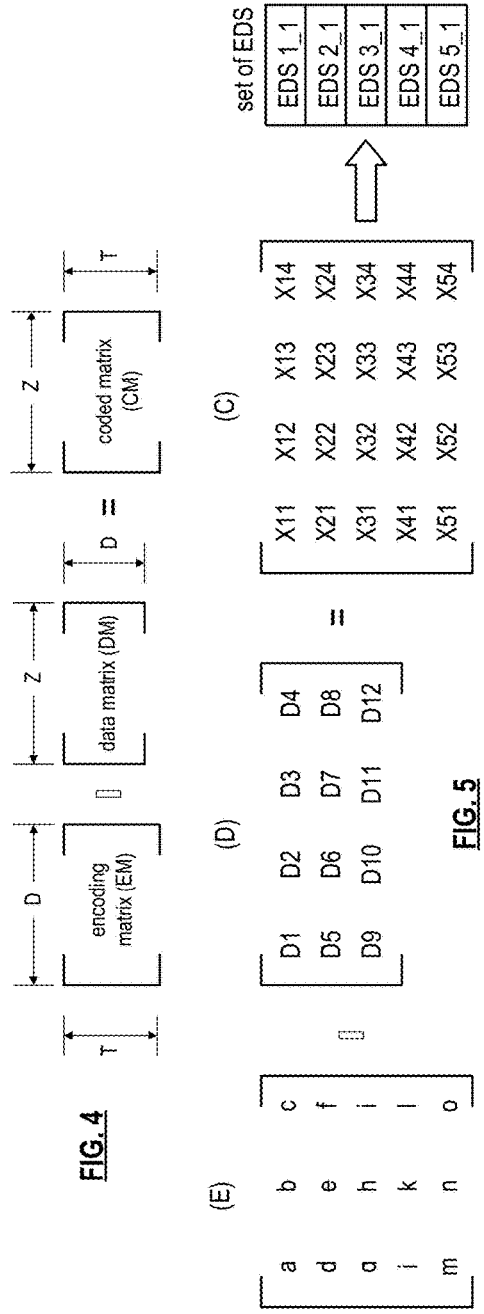
FIG. 4
FIG. 5
FIG. 6

COORDINATION OF TASK EXECUTION IN A DISTRIBUTED STORAGE NETWORK

CROSS-REFERENCE TO RELATED APPLICATIONS

The present U.S. Utility Patent application claims priority pursuant to 35 U.S.C. § 120 as a continuation of U.S. Utility application Ser. No. 15/248,716, entitled "Layered Queue Based Coordination Of Potentially Destructive Actions In A Dispersed Storage Network Memory", filed Aug. 26, 2016, which in turn claims priority pursuant to 35 U.S.C. § 119(e) to U.S. Provisional Application No. 62/222,819, entitled "Identifying An Encoded Data Slice For Rebuilding," filed Sep. 24, 2015, each of which is hereby incorporated herein by reference in its entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks, and more particularly to coordination of potentially harmful maintenance actions in a dispersed storage network.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on a remote storage system. The remote storage system may include a RAID (redundant array of independent disks) system and/or a dispersed storage system that uses an error correction scheme to encode data for storage.

In a RAID system, a RAID controller adds parity data to the original data before storing it across an array of disks. The parity data is calculated from the original data such that the failure of a single disk typically will not result in the loss of the original data. While RAID systems can address certain memory device failures, these systems may suffer from effectiveness, efficiency and security issues. For instance, as more disks are added to the array, the probability of a disk failure rises, which may increase maintenance costs. When a disk fails, for example, it needs to be manually replaced before another disk(s) fails and the data stored in the RAID system is lost. To reduce the risk of data loss, data on a RAID device is often copied to one or more other RAID devices. While this may reduce the possibility of data loss, it also raises security issues since multiple copies of data may be available, thereby increasing the chances of unauthorized access. In addition, co-location of some RAID devices may result in a risk of a complete data loss in the event of a natural disaster, fire, power surge/outage, etc.

BRIEF DESCRIPTION OF THE SEVERAL VIEWS OF THE DRAWING(S)

FIG. 3 is a schematic block diagram of an example of dispersed storage error encoding of data in accordance with the present disclosure;

FIG. 4 is a schematic block diagram of a generic example of an error encoding function in accordance with the present disclosure;

FIG. 5 is a schematic block diagram of a specific example of an error encoding function in accordance with the present disclosure;

FIG. 6 is a schematic block diagram of an example of slice naming information for an encoded data slice (EDS) in accordance with the present disclosure;

DETAILED DESCRIPTION OF THE INVENTION

Figure 1:
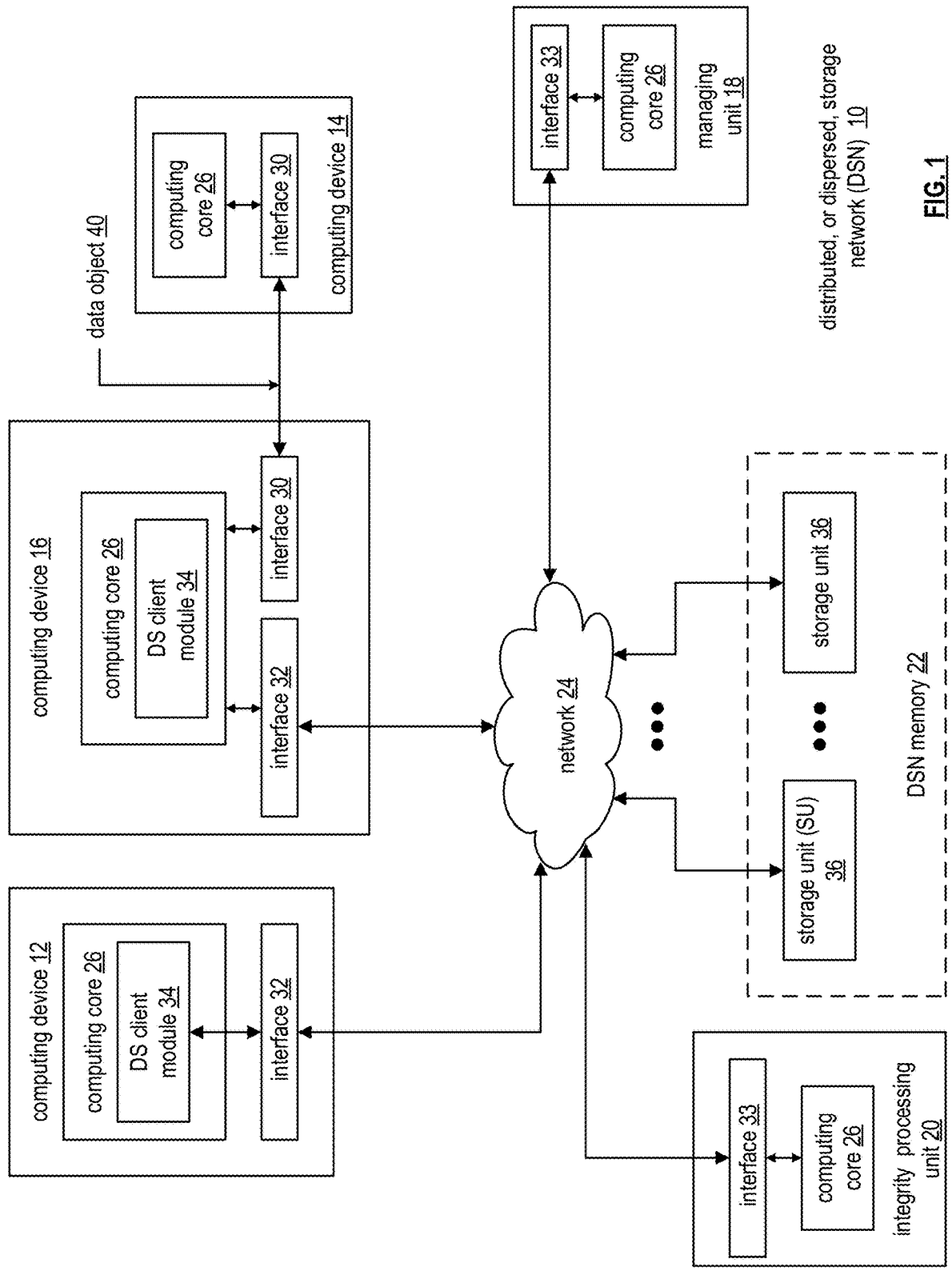
FIG. 1 is a schematic block diagram of an embodiment of a dispersed or distributed storage network (DSN) in accordance with the present disclosure.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
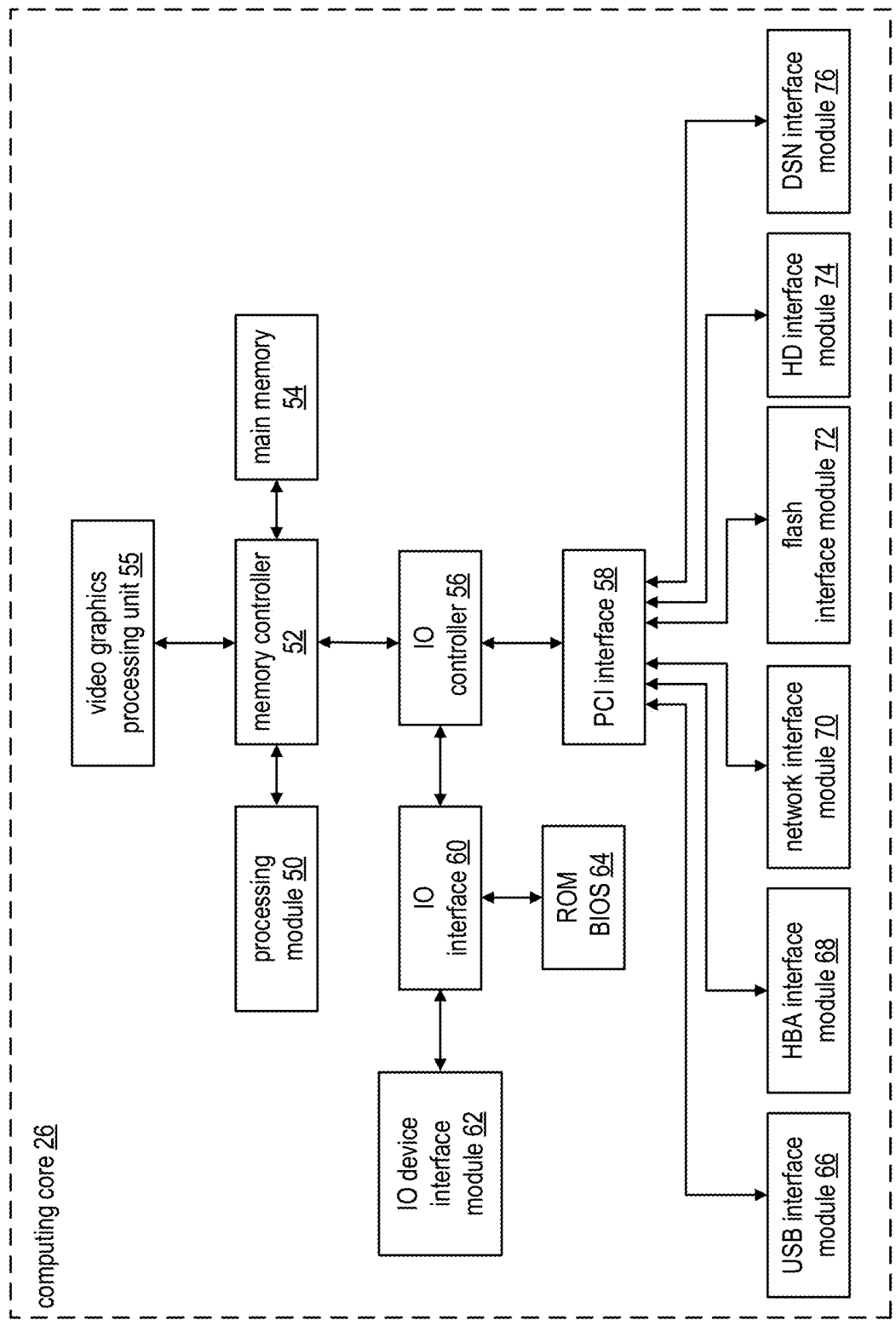
FIG. 2 is a schematic block diagram of an embodiment of a computing core in accordance with the present disclosure.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed storage (DS) error encoded data.

Each of the storage units 36 is operable to store DS error encoded data and/or to execute (e.g., in a distributed manner) maintenance tasks and/or data-related tasks. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, maintenance tasks such as those described below, etc.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data object 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate per-access billing information. In another instance, the managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

To support data storage integrity verification within the DSN 10, the integrity processing unit 20 (and/or other devices in the DSN 10) may perform rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. Retrieved encoded slices are checked for errors due to data corruption, outdated versioning, etc. If a slice includes an error, it is flagged as a 'bad' or 'corrupt' slice. Encoded data slices that are not received and/or not listed may be flagged as missing slices. Bad and/or missing slices may be subsequently rebuilt using other retrieved encoded data slices that are deemed to be good slices in order to produce rebuilt slices. A multi-stage decoding process may be employed in certain circumstances to recover data even when the number of valid encoded data slices of a set of encoded data slices is less than a relevant decode threshold number. The rebuilt slices may then be written to DSN memory 22. Note that the integrity processing unit 20 may be a separate unit as shown, included in DSN memory 22, included in the computing device 16, and/or distributed among the storage units 36. Examples of task queuing, initiation and execution by DSN memory 22 is discussed in greater detail with reference to FIGS. 9-13.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of five, a decode threshold of three, a read threshold of four, and a write threshold of four. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number. In the illustrated example, the value X11=aD1+bD5+cD9, X12=aD2+bD6+cD10, . . . X53=mD3+nD7+oD11, and X54=mD4+nD8+oD12.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as at least part of a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
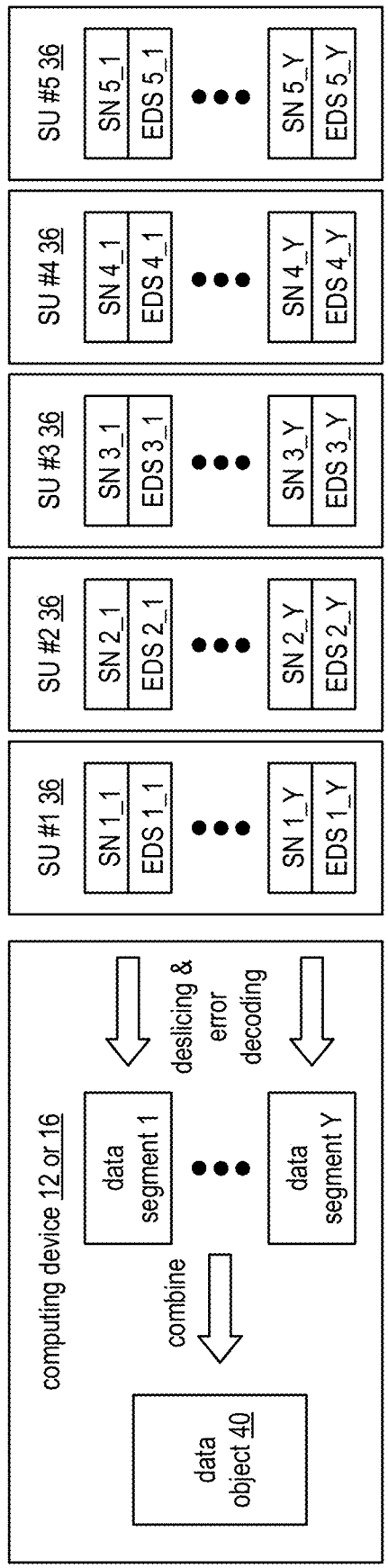
FIG. 7 is a schematic block diagram of an example of dispersed storage error decoding of data in accordance with the present disclosure.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
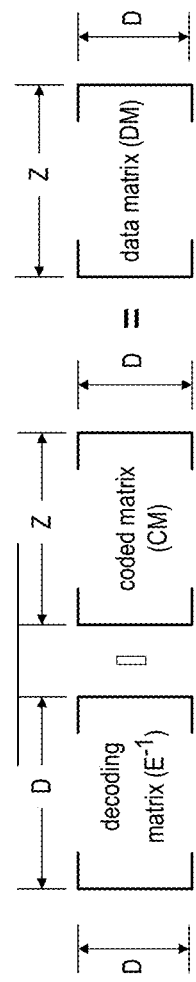
FIG. 8 is a schematic block diagram of a generic example of an error decoding function in accordance with the present disclosure.

In order to recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
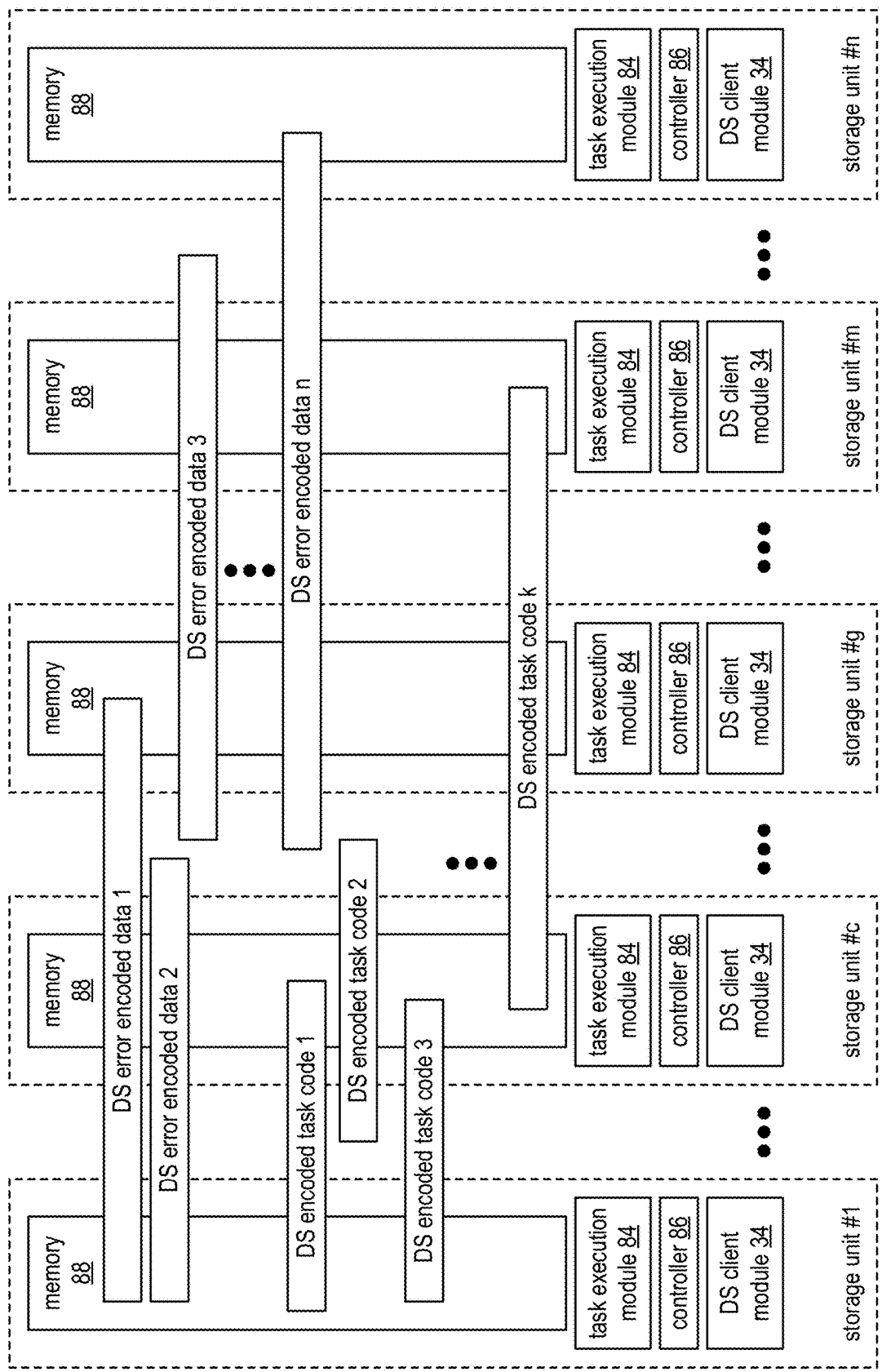
FIG. 9 is a schematic block diagram of an example of DSN memory storing a plurality of data and a plurality of task codes in accordance with the present disclosure.

FIG. 9 is a schematic block diagram of an example of DSN memory 22 storing a plurality of data and a plurality of task codes in accordance with the present disclosure. The illustrated DSN memory 22 includes a plurality of storage units 1-*n* (where, for example, n is an integer greater than or equal to three). Each of the storage units includes a DS client module 34, a controller 86, one or more task execution modules 84, and memory 88.

In this example, the DSN memory 22 stores, in memory 88 of the storage units, a plurality of dispersed storage (DS) error encoded data (e.g., 1-*n*, where n is an integer greater than or equal to two) and stores a plurality of DS encoded task codes (e.g., 1-*k*, where k is an integer greater than or equal to two). The DS error encoded data may be encoded in accordance with one or more examples described with reference to FIGS. 3-6, and organized (for example) in slice groupings or pillar groups. The data that is encoded into the DS error encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into a DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, maintenance-related (e.g., to support hardware upgrades, reboot operations, process restarts, installation of software patches), etc. The tasks may be encoded into the DS encoded task code in a similar manner to encoded data (e.g., organized in slice groupings or pillar groups). Operational codes and instructions for certain types of tasks performed by the DSN memory 22, such as task types relating to some maintenance operations that are not associated with DS error encoded data stored in memory 88, may be maintained by other devices/modules of a DSN.

In an example of operation, a DS client module of a user device or computing device issues a dispersed storage task (DST) request to the DSN memory 22. The DST request may include a request to retrieve stored data, or a portion thereof, may include a request to store data that is included with the DST request, may include a request to perform one or more tasks on stored data, may include a request to perform one or more tasks on data included with the DST request, may initiate a maintenance task, etc. In the cases where the DST request includes a request to store data or to retrieve data, the DS client module and/or the DSN memory processes the request. In the case where the DST request includes a request to perform one or more tasks on data included with the DST request, or stored data, the DS client module and/or the DSN memory process the DST request.

Excluding certain maintenance tasks and the like, the DS client module generally identifies data and one or more tasks for the DSN memory to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

The controller 86 facilitates execution of tasks and/or partial task(s). In an example, the controller 86 interprets a partial task in light of the capabilities of the task execution module(s) 84. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the task execution module(s) 84 have sufficient capabilities, it generates task control information. As described more fully below, the task execution module(s) 84 and/or controller 86 may further operate to provide status information for use in predicting the impact of performing a given task before initiating the task.

The task control information may be a generic instruction (e.g., perform the task on the stored slice grouping) or a series of operational codes. In the former instance, the task execution module 84 includes a co-processor function specifically configured (fixed or programmed) to perform the desired task. In the latter instance, the task execution module 84 includes a general processor topology where the controller stores an algorithm corresponding to the particular task. In this instance, the controller 86 provides the operational codes (e.g., assembly language, source code of a programming language, object code, etc.) of the algorithm to the task execution module 84 for execution.

Figure 10:
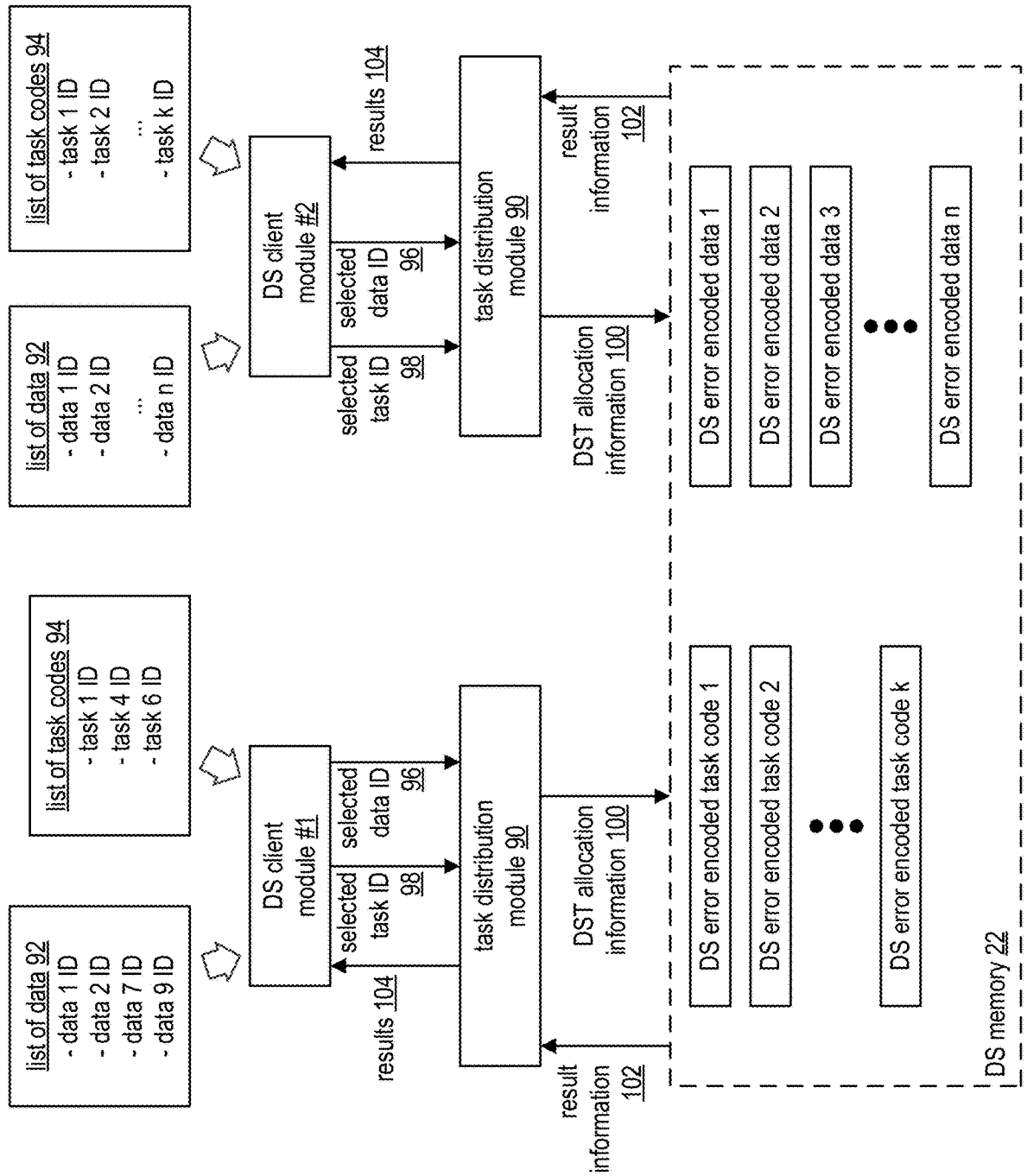
FIG. 10 is a schematic block diagram of an example of a DSN performing tasks on stored data/storage units in accordance with the present disclosure.

FIG. 10 is a schematic block diagram of an example of a DSN performing tasks on stored data and/or storage units in accordance with the present disclosure. In this example, two dispersed storage (DS) client modules 1-2 are shown: the first may be associated with a user device and the second may be associated with a processing unit or a high priority user device (e.g., high priority clearance user, system administrator, etc.). Each DS client module includes a list of stored data 92 and a list of tasks codes 94. The list of stored data 92 includes one or more entries of data identifying information, where each entry identifies data stored in the DSN memory 22. The data identifying information (e.g., data ID) includes one or more of a data file name, a data file directory listing, DSTN addressing information of the data, a data object identifier, etc. The list of task codes 94 includes one or more entries of task code identifying information, when each entry identifies task codes stored in the DSN memory 22. The task code identifying information (e.g., task ID) includes one or more of a task file name, a task file directory listing, DSTN addressing information of the task, another type of identifier to identify the task, etc.

As illustrated, the list of data 92 and the list of task codes 94 has a smaller number of entries for the first DS client module than the corresponding lists of the second DS client module. This may occur because the user device associated with the first DS client module has fewer privileges in the DSN than the device associated with the second DS client module. Alternatively, this may occur because the user device associated with the first DS client module serves fewer users than the device associated with the second DS client module and is restricted by the DSN accordingly. As yet another alternative, this may occur through no restraints by the DSN, but rather because the operator of the user device associated with the first DS client module has selected fewer data and/or fewer tasks than the operator of the device associated with the second DS client module.

In an example of operation, the first DS client module selects one or more data entries and one or more tasks from their respective lists (e.g., illustrated as selected data ID 96 and selected task ID 98, respectively). The first DS client module sends its selections to a task distribution module 90. The task distribution module 90 may be within a stand-alone device of the DSN, may be within the user device that contains the first DS client module, or may be within the DSN memory 22.

Regardless of the location of the task distribution module, it generates DST allocation information 100 from the selected task ID 98 and the selected data ID 96. The DST allocation information 100 includes data partitioning information, task execution information, and/or intermediate result information. The task distribution module 90 sends the DST allocation information 100 to the DSN memory 22. Note that examples of the DST allocation information are described in conjunction with FIG. 11.

The DSN memory 22 interprets the DST allocation information 100 to identify the stored DS error encoded data (e.g., DS error encoded data 2) and to identify the stored DS error encoded task code (e.g., DS error encoded task code 1). In addition, the DSN memory 22 interprets the DST allocation information 100 to determine how the data is to be partitioned and how the task is to be partitioned. The DSN memory 22 also determines whether the error encoded data corresponding to selected data ID 96 needs to be converted from pillar grouping to slice grouping. If so, the DSN memory 22 converts the selected DS error encoded data into slice groupings and stores the slice grouping DS error encoded data by overwriting the pillar grouping DS error encoded data or by storing it in a different location in the memory of the DSN memory 22 (i.e., does not overwrite the pillar grouping DS error encoded data).

The DSN memory 22 partitions the data and the task as indicated in the DST allocation information 100 and sends the portions to selected storage units of the DSN memory 22. Each of the selected storage units performs its partial task(s) on its slice groupings to produce partial results. The DSN memory 22 collects the partial results from the selected storage units and provides them, as result information 102, to the task distribution module. The result information 102 may be the collected partial results, one or more final results as produced by the DSN memory 22 from processing the partial results in accordance with the DST allocation information 100, or one or more intermediate results as produced by the DSN memory 22 from processing the partial results in accordance with the DST allocation information 100.

The task distribution module 90 receives the result information 102 and provides one or more final results 104 therefrom to the first DS client module. The final result(s) 104 may be result information 102 or a result(s) of processing of the result information 102 by the task distribution module.

In concurrence with processing the selected task of the first DS client module, the DSN may process the selected task(s) of the second DS client module on the selected data(s) of the second DS client module. Alternatively, the DSN may process the second DS client module's request subsequent to, or preceding, that of the first DS client module. Regardless of the ordering and/or parallel processing of the DS client module requests, the second DS client module provides its selected data ID 96 and selected task ID 98 to a task distribution module 90. If the task distribution module 90 is a separate device of the DSN or within the DSN memory, the task distribution modules 90 coupled to the first and second DS client modules may be the same module. The task distribution module 90 processes the request of the second DS client module in a similar manner as it processed the request of the first DS client module.

Figure 11:
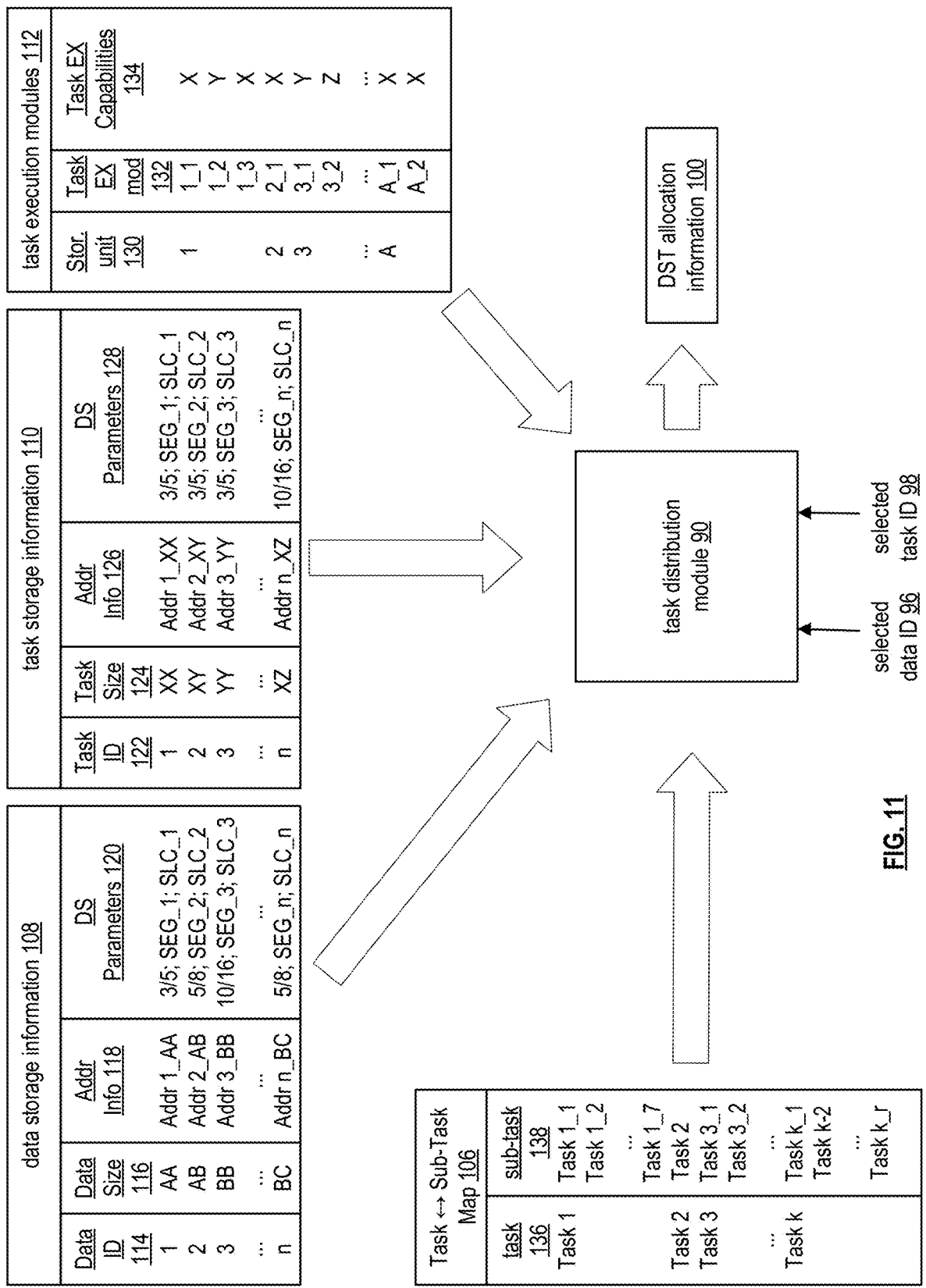
FIG. 11 is a schematic block diagram of an embodiment of a task distribution module facilitating the example of FIG. 10 in accordance with the present disclosure.

FIG. 11 is a schematic block diagram of an embodiment of a task distribution module 90 facilitating the example of FIG. 10 in accordance with the present disclosure. The task distribution module 90 (e.g., of a managing unit 18) includes a plurality of tables it uses to generate dispersed storage and task (DST) allocation information 100 for selected data and selected tasks received from a DS client module. The tables include data storage information 108, task storage information 110, task execution module information 112, and task-⇔sub-task mapping information 106.

The data storage information table 108 includes a data identification (ID) field 114, a data size field 116, an addressing information field 118, dispersed storage (DS) information 120, and may further include other information regarding the data, how the data is stored, and/or how it can be processed. For example, DS error encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 110 includes a task identification (ID) field 122, a task size field 124, an addressing information field 126, dispersed storage (DS) information 128, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task⇔sub-task mapping information table 106 includes a task field 136 and a sub-task field 138. The task field 136 identifies a task stored in the memory of DSN memory 22 and the corresponding sub-task fields 138 indicates whether the task includes sub-tasks and, if so, how many and if any of the sub-tasks are ordered (i.e., are dependent on the outcome of another task) or non-ordered (i.e., are independent of the outcome of another task). In this example, the task⇔sub-task mapping information table 106 includes an entry for each task stored in memory of the DSN memory 22 (e.g., task 1 through task k). In particular, this example indicates that task 1 includes 7 sub-tasks, task 2 does not include sub-tasks, and task k includes r number of sub-tasks (where r is an integer greater than or equal to two).

The task execution module information table 112 includes a storage unit ID field 130, a task execution module ID field 132, and a task execution module capabilities field 134. The storage unit ID field 130 includes the identity of storage units in the DSN memory. The task execution module ID field 132 includes the identity of each task execution unit in each storage unit. For example, storage unit 1 includes three task executions modules (e.g., 1_1, 1_2, and 1_3). The task execution capabilities field 134 includes identity of the capabilities of the corresponding task execution unit. For example, task execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 90 generates the DST allocation information 100 to indicate where the data is stored, how to partition the data, where the task is stored, how to partition the task, which task execution units should perform which partial task on which data partitions, where and how intermediate results are to be stored, etc. If multiple tasks are being performed on the same data or different data, the task distribution module factors such information into its generation of the DST allocation information.

Certain tasks performed by storage units of a DSN, including some maintenance tasks, may adversely impact the integrity of the DSN (e.g., cause irrecoverable data loss or unavailability of critical services) if performed at the wrong time. Such tasks may include, for example, updating hardware, reboot operations, process restarts, installing software patches, and other "potentially destructive" tasks that result in temporary unavailability of a storage unit. Novel methodologies are described herein for coordinated execution of these types of tasks, such that a limited number of storage units of the DSN (e.g., storage units of a particular storage set or vault) are impacted at any one point in time before proceeding to process other storage units.

As described more fully below in conjunction with FIGS. 12 and 13, such methodologies may involve an automated process that operates to ensure proper function of the DSN memory while performing tasks on a desired number of storage units. When such tasks are to be performed, a selection of associated storage units is added (e.g., by a managing unit 18 and/or task distribution module 90) to an ordered list or queue corresponding to the action(s) to be performed. Queues which have an entry are analyzed to determine if the storage unit identified at the top of each such queue can be occupied or otherwise made unavailable during performance of the associated task without compromising the reliability, for example, of a storage set/vault in which the storage unit participates. If so, the relevant queue entry is deleted and the task is performed. If not, the relevant queue entry is moved to another location in the queue (e.g., the end of the queue) and the task is re-evaluated at a later time. Processing then continues until each queue is empty or until every storage device has been moved to the end of a queue at least once without progress. If no progress has been made based on the unavailability of storage units, further processing may be delayed until the availability of one or more storage units is restored.

Figure 12:
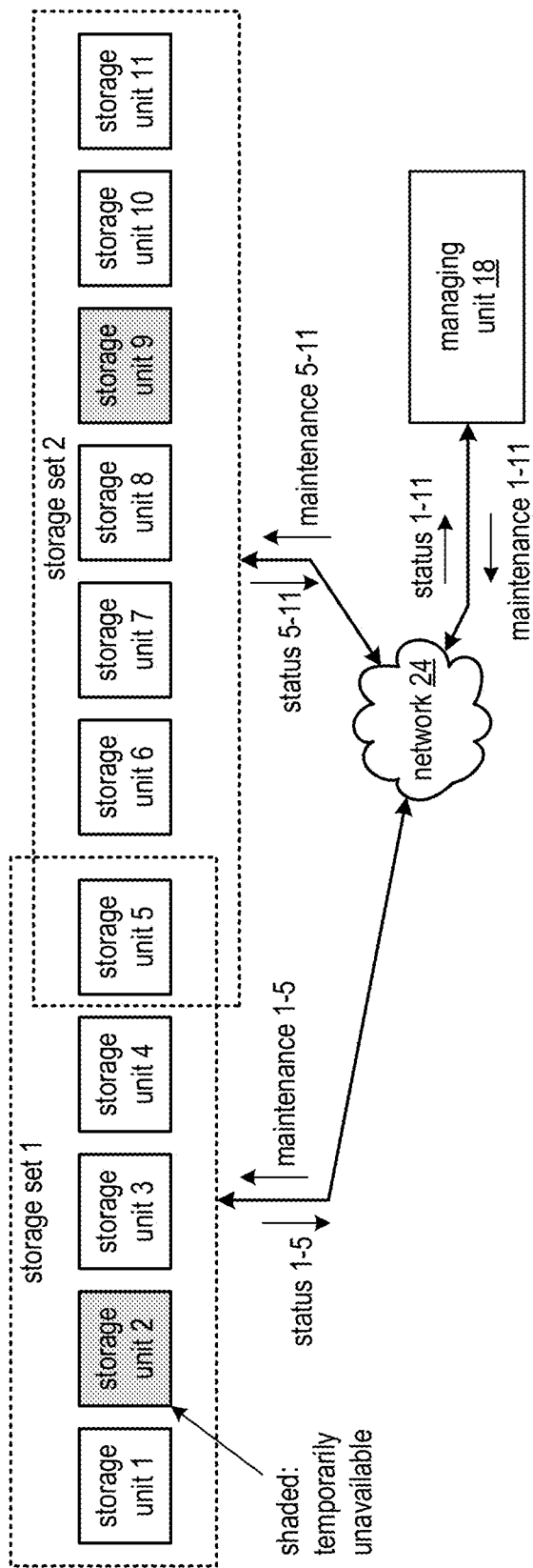
FIG. 12 is schematic block diagram of an embodiment of a DSN in accordance with the present disclosure.

Referring more particularly to FIG. 12, a schematic block diagram of a dispersed storage network (DSN) in accordance with the present disclosure is shown. In the illustrated embodiment, the DSN includes storage sets 1-2, the network 24 of FIG. 1, and the managing unit 18 of FIG. 1. Each of the storage sets 1-2 include a set of storage units, where each storage unit may be associated with more than one storage set. For example, storage set 1 includes storage units 1-5 (e.g., a pillar width of five and a decode threshold of three) and storage set 2 includes storage units 5-11 (e.g., a pillar width of seven and a decode threshold of four). Each storage unit may be implemented utilizing the storage unit 36 of FIG. 1. Hereafter, each storage set may be interchangeably referred to as a set of storage units. While the DSN of the illustrated embodiment functions to initiate a maintenance task as described more fully below, other types of tasks may be similarly processed.

In an example of operation of initiating a maintenance task, for each maintenance task type of one or more maintenance tasks to be performed on the storage units of the DSN, the managing unit 18 generates an ordered list (e.g., a queue) of one or more storage units to perform the maintenance task of the maintenance task type to produce one or more ordered lists. A maintenance task may include one or more of updating hardware, rebooting software, restarting a particular software process, performing an upgrade, installing a software patch, loading a new software revision, performing an off-line test, prioritizing tasks associated with an online test, etc. As an example of generating the ordered list, the managing unit 18 maintains a queue for the maintenance task type, where each entry of the queue is associated with a unique storage unit and where a first ordered list entry corresponds to a top queue entry (e.g., a next entry to come out of the queue when the queue is accessed to retrieve a next queue entry).

For a given ordered list, the managing unit 18 determines whether to initiate execution of a maintenance task by a corresponding storage unit for a first ordered list entry (e.g., top queue entry). The determining includes one or more of selecting the top queue entry, identifying a corresponding storage unit associated with the selected entry, predicting the impact of performing the maintenance task of the maintenance task type associated with the given ordered list, initiating/indicating to perform the maintenance task when the predicted impact compares favorably to an impact threshold level, and indicating not to perform the maintenance task when the predicted impact compares unfavorably to the impact threshold level.

Predicting the impact of performing a task may include one or more of identifying one or more storage sets associated with the storage unit, obtaining availability information regarding other storage units associated with the one or more storage sets (e.g., receiving status information from a DS client module 34 or controller 86 of each relevant storage unit), and estimating a performance and/or storage reliability level should the storage unit be instructed to execute the maintenance task. For example, the managing unit 18 determines not to initiate execution of a maintenance task for storage unit 5 when a number of other storage units of the storage set 1 are unavailable (e.g., storage unit 2 as indicated by status 1-5) and a resulting availability level of storage units for the storage set 1 is less than (or compares unfavorably to) a desired storage unit availability threshold level; and when a number of other storage units of the storage set 2 are unavailable (e.g., storage unit 9 as indicated by status 5-11) and a resulting availability level of storage units for the storage set 2 is less than the desired storage unit availability threshold level. As another example, the managing unit 18 determines to perform a maintenance task for storage unit 4 when the resulting availability level of storage units of the storage set 1 is greater than (or compares favorably to) the desired storage unit availability threshold level.

When not initiating the execution of the maintenance task, the managing unit 18 moves the first ordered list entry to another location within the ordered list. Moving the entry includes at least one of identifying a position, such as the bottom the queue, and moving the first ordered list entry to that identified position. Having moved the first ordered list entry, the managing unit 18 repeats the process for the next ordered list entry or an entry in a different ordered list (e.g., corresponding to a different maintenance task). Selection of an ordered list from a plurality of ordered lists may be based on, for example, one or more of: a first-in-first-out (FIFO) approach to task request processing, the number of entries in respective ordered lists, a priority level associated with a maintenance task type, storage unit availability levels, a request, a predetermination, etc.

For certain tasks that do not depend on a particular storage unit/set of storage units, the management unit 18 may try an initial candidate storage unit (e.g., randomly assigned or assigned based on availability criteria). If the predicted impact of using the initial candidate storage unit compares unfavorably to relevant threshold, the management unit 18 may select another candidate storage unit and repeat the process until a favorable comparison is identified. If an available storage unit(s) is not identified for performing the task, the corresponding ordered list entry is moved to another position in the ordered list or otherwise de-prioritized.

When initiating the execution of the maintenance task, the managing unit 18 issues a maintenance request to the storage unit for the maintenance task and deletes the maintenance task from the relevant ordered list. For example, the managing unit 18 issues, via the network 24, a maintenance message 1-5 to the storage unit 4 to facilitate execution of the associated maintenance task. In another example, the managing unit 18 issues, via the network 24, a maintenance message 5-11 to the storage unit 8 to facilitate execution of an associated maintenance task. Having deleted the maintenance task, the process is repeated for the next ordered list.

Figure 13:
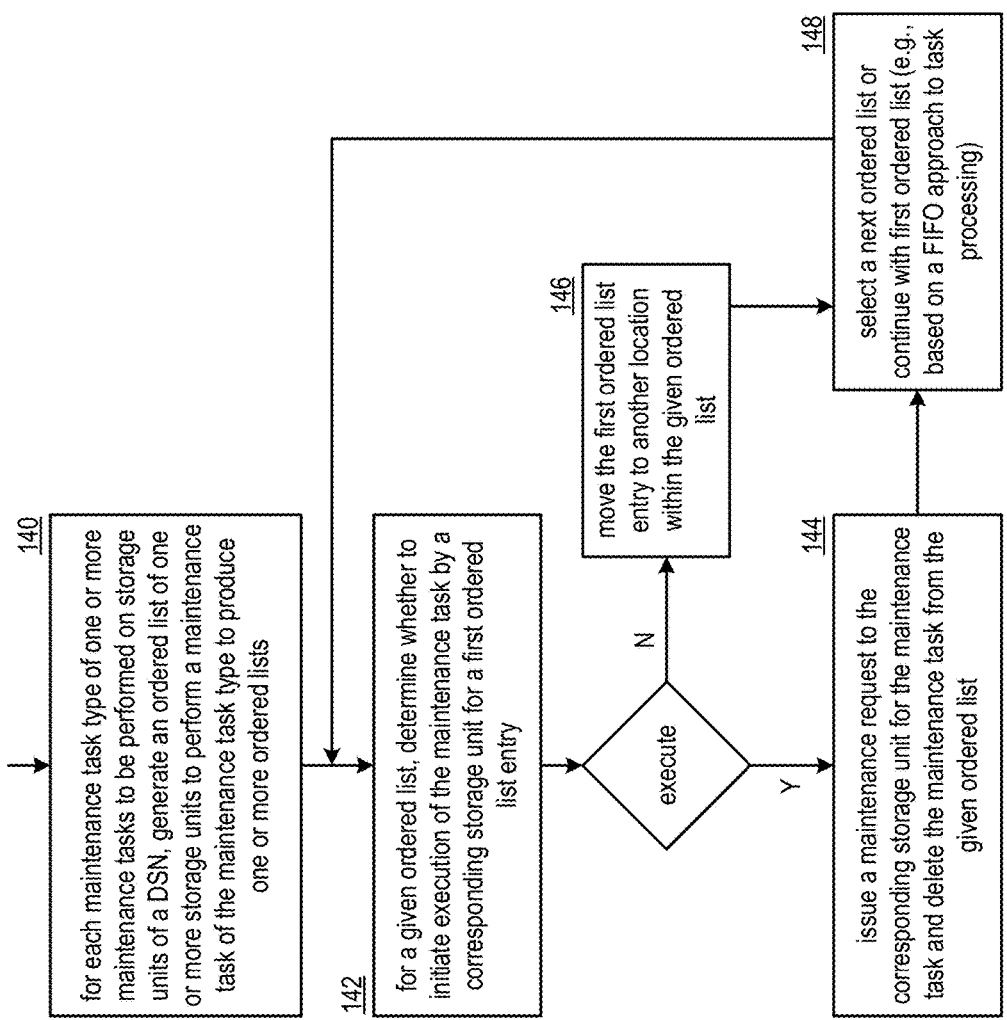
FIG. 13 is a logic diagram illustrating an example of initiating a maintenance task in accordance with the present disclosure.

FIG. 13 is a logic diagram illustrating an example of initiating a maintenance task in accordance with the present disclosure. In particular, a method is presented for use in conjunction with one or more functions and features described in conjunction with FIGS. 1-12. The method begins or continues at step 140 where one or more processing modules (e.g., of a dispersed storage network (DSN) managing unit 18 or computing device 16), for each maintenance task type of one or more maintenance tasks performed in storage units of a DSN, generates an ordered list of one or more storage units to perform a maintenance task of the maintenance task type to produce one or more ordered lists. For example, the processing module maintains a queue for a given maintenance task type, where each entry of the queue is associated with a unique storage unit.

For a given ordered list, the method continues at step 142 where the processing module determines whether to initiate execution of the maintenance task by a storage unit corresponding to a first ordered list entry. For example, the processing module selects a top queue entry, identifies a corresponding storage unit, predicts impact of performing the maintenance task of the maintenance task type associated with the given ordered list, and indicates to perform the maintenance task when the predicted impact compares favorably to an impact threshold level. The method branches to step 144 where the processing module issues a maintenance request when the processing module determines to execute the maintenance task. When the processing module determines not to execute the maintenance task, the method instead branches to step 146 where the processing module moves the first-ordered list entry to another location within the given ordered list. Moving the entry includes identifying a position and moving the entry to the identified position (e.g., to the bottom). The method then continues to step 148 where the processing module selects a next ordered list or determines to continue processing of entries in the first ordered list.

When the maintenance task is to be executed, the processing module issues (as step 144) a maintenance request to the corresponding storage unit for the maintenance task and deletes the maintenance task from the given ordered list. For example, the processing module generates the maintenance/task request based on the maintenance/task type of the maintenance task, sends the maintenance request to the corresponding storage unit, and deletes the ordered list entry of the maintenance task from the given ordered list.

The method continues at step 148 where the processing module selects a next ordered list or determines to continue processing of entries in the first ordered list. Selecting a next ordered list following either of steps 144 or 146 may be based on one or more of: task pendency durations wherein multiple pending task/sub-task requests are processed in the order in which they were generated (i.e., a FIFO approach), the number of entries in at least some of the ordered lists, a priority level associated with a maintenance task type, storage unit availability levels, a request, or a predetermination. Having selected the next ordered list, the method loops back to step 142 where the processing module determines whether to initiate execution of the maintenance task (e.g., of the next ordered list).

The methods described above in conjunction with the computing device and the storage units can alternatively be performed by other modules of the dispersed storage network or by other devices. For example, any combination of a first module, a second module, a third module, a fourth module, etc. of the computing device and the storage units may perform the method described above. In addition, at least one memory section (e.g., a first memory section, a second memory section, a third memory section, a fourth memory section, a fifth memory section, a sixth memory section, etc. of a non-transitory computer readable storage medium) that stores operational instructions can, when executed by one or more processing modules of one or more computing devices and/or by the storage units of the dispersed storage network (DSN), cause the one or more computing devices and/or the storage units to perform any or all of the method steps described above.

As may be used herein, the terms "substantially" and "approximately" provides an industry-accepted tolerance for its corresponding term and/or relativity between items. Such an industry-accepted tolerance ranges from less than one percent to fifty percent. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   receiving, by a computing device of a storage network, a maintenance task to be performed by a plurality of storage units of the storage network, wherein the maintenance task does not include a user data allocation request, and wherein an execution of the maintenance task by a particular storage unit of the plurality of storage units results in temporary unavailability of the particular storage unit to perform a user data allocation request;
   determining, by the computing device, the availability of processing resources of storage units of the plurality of storage units for execution of the received maintenance task;
   comparing, by the computing device, the respective availability of the processing resources of the storage units of the plurality of storage units to identify a storage unit for execution of the received maintenance task; and
   allocating the received maintenance task to the identified storage unit of the plurality of storage units.

2. The method of claim 1, wherein comparing the respective availability of the processing resources of the storage units of the plurality of storage units to identify a storage unit for execution of the received maintenance task includes:
   predicting an impact, with respect to other storage units of the plurality of storage units, of performing the received maintenance task on the identified storage unit to generate a predicted impact;
   performing a comparison of the predicted impact to a storage unit availability threshold level; and
   in response to determining that the comparison is favorable, indicating to allocate the received maintenance task to the identified storage unit.

3. The method of claim 2, wherein comparing the respective availability of the processing resources of the storage units of the plurality of storage units to identify a storage unit for execution of the received maintenance task further includes:
   predicting an impact, with respect to other storage units of the plurality of storage units, of performing the received maintenance task on a first storage unit of the plurality of storage units to generate a first predicted impact;

performing a comparison of the first predicted impact to a storage unit availability threshold level; and in response to determining that the comparison is unfavorable, indicating not to allocate the received maintenance task to the first storage unit.

4. The method of claim 1, wherein the identified storage unit is associated with the plurality of storage units as one or more sets of storage units.

5. The method of claim 1 further comprises:
generating an ordered list of tasks to be performed by one or more storage units of the plurality of storage units, wherein the received maintenance task is included in the ordered list of tasks.

6. The method of claim 5, wherein the ordered list of tasks is associated with a task type corresponding to the received maintenance task.

7. The method of claim 1, wherein allocating the received maintenance task to the identified storage unit of the plurality of storage units includes issuing a task request, corresponding to the received maintenance task, for reception by the identified storage unit to facilitate execution of the received maintenance task.

8. The method of claim 1, wherein the user data allocation request is a request to write data or a request to read data.

9. The method of claim 1, wherein the received maintenance task is a partial maintenance task.

10. A computing device comprises:
at least one network interface;
memory that stores operational instructions; and
processing circuitry operably coupled to the at least one network interface and to the memory, wherein the processing circuitry is configured to execute the operational instructions to:
receive, via the at least one network interface, a maintenance task to be performed by a plurality of storage units of a storage network, wherein the maintenance task does not include a user data allocation request, and wherein an execution of the maintenance task by a particular storage unit of the plurality of storage units results in temporary unavailability of the particular storage unit for performing a request to store data;
determine the availability of processing resources of storage units of the plurality of storage units for execution of the received maintenance task;
compare the respective availability of the processing resources of the storage units of the plurality of storage units to identify a storage unit for execution of the received maintenance task; and
allocate, via the at least one network interface, the received maintenance task to the identified storage unit of the plurality of storage units.

11. The computing device of claim 10, wherein comparing the respective availability of the processing resources of the storage units of the plurality of storage units to identify a storage unit for execution of the received maintenance task includes:
predicting an impact, with respect to other storage units of the plurality of storage units, of performing the received maintenance task on the identified storage unit to generate a predicted impact;
performing a comparison of the predicted impact to a storage unit availability threshold level; and
in response to determining that the comparison is favorable, indicating to allocate the received maintenance task to the identified storage unit.

12. The computing device of claim 11, wherein comparing the respective availability of the processing resources of the storage units of the plurality of storage units to identify a storage unit for execution of the received maintenance task further includes:
predicting an impact, with respect to other storage units of the plurality of storage units, of performing the received maintenance task on a first storage unit of the plurality of storage units to generate a first predicted impact;
performing a comparison of the first predicted impact to a storage unit availability threshold level; and
in response to determining that the comparison is unfavorable, indicating not to allocate the received maintenance task to the first storage unit.

13. The computing device of claim 11, wherein the predicted impact relates to a storage reliability level.

14. The computing device of claim 10, wherein the processing circuitry is further configured to execute the operational instructions to:
generate an ordered list of tasks to be performed by one or more storage units of the plurality of storage units, wherein the received maintenance task is included in the ordered list of tasks.

15. The computing device of claim 14, wherein the ordered list of tasks is associated with a task type corresponding to the received maintenance task.

16. The computing device of claim 10, wherein allocating the received maintenance task to the identified storage unit of the plurality of storage units includes issuing, via the at least one network interface, a task request for reception by the identified storage unit to facilitate execution of the received maintenance task.

17. The computing device of claim 10, wherein an execution of the maintenance task by the particular storage unit of the plurality of storage units further results in temporary unavailability of the particular storage unit for performing a request to read stored data.

18. The computing device of claim 10, wherein the received maintenance task is a partial maintenance task.

19. A computer readable storage medium comprises:
at least one memory section that stores operational instructions that, when executed by one or more processing modules of one or more computing devices of a storage network, causes the one or more computing devices to:
receive a maintenance task to be performed by a plurality of storage units of the storage network, wherein the maintenance task does not include a user data allocation request, and wherein an execution of the maintenance task by a particular storage unit of the plurality of storage units results in temporary unavailability of the particular storage unit to perform a user data allocation request;
determine the availability of processing resources of storage units of the plurality of storage units for execution of the received maintenance task;
compare the respective availability of the processing resources of the storage units of the plurality of storage units to identify a storage unit for execution of the received maintenance task; and
allocate the received maintenance task to the identified storage unit of the plurality of storage units.

20. The computer readable storage medium of claim 19, wherein comparing the respective availability of the processing resources of the storage units of the plurality of storage units to identify a storage unit for execution of the received maintenance task includes:

predicting an impact, with respect to other storage units of the plurality of storage units, of performing the received maintenance task on the identified storage unit to generate a predicted impact;

performing a comparison of the predicted impact to a storage unit availability threshold level; and in response to determining that the comparison is favorable, indicating to allocate the received maintenance task to the identified storage unit.

* * * * *